(12) United States Patent
Wen et al.

(10) Patent No.: US 8,172,425 B2
(45) Date of Patent: May 8, 2012

(54) LOW-PROFILE LIGHT-EMITTING DIODE LAMP STRUCTURE

(75) Inventors: Fong-Yuan Wen, Taipei (TW); Li-Hsin Chou, Taipei (TW)

(73) Assignee: Crownmate Technology Co., Ltd., Taipei (TW)

( * ) Notice: Subject to any disclaimer, the term of this patent is extended or adjusted under 35 U.S.C. 154(b) by 358 days.

(21) Appl. No.: 12/654,223

(22) Filed: Dec. 15, 2009

(65) Prior Publication Data

US 2010/0157596 A1   Jun. 24, 2010

(30) Foreign Application Priority Data

Dec. 19, 2008   (TW) ................................ 97149574 A

(51) Int. Cl.
*F21S 4/00* (2006.01)
*F21V 21/00* (2006.01)

(52) U.S. Cl. .................... 362/249.02; 362/223; 362/267; 362/294; 362/373; 362/311.02

(58) Field of Classification Search .................. 362/223, 362/249.02, 267, 294, 311.02, 373
See application file for complete search history.

(56) References Cited

U.S. PATENT DOCUMENTS

| 7,631,988 | B2 * | 12/2009 | Xie et al. | ........................ 362/294 |
| 8,100,557 | B2 * | 1/2012 | Chen et al. | ............... 362/249.02 |
| 2011/0044038 | A1 * | 2/2011 | Mo | ................................ 362/235 |

* cited by examiner

*Primary Examiner* — Stephen F Husar
*Assistant Examiner* — James Cranson, Jr.
(74) *Attorney, Agent, or Firm* — Bacon & Thomas, PLLC

(57) ABSTRACT

A low-profile light-emitting diode (LED) lamp includes a base, a cover, a heat dissipation plate, an LED module, a circuit board, and a light guide hood. The base and the cover respectively form a base opening and a cover opening. The base and the cover include a recess-projection mating structure therebetween to form an outer water sealing wall and an inner water sealing wall that surround the base opening and the cover opening. The light guide hood, the circuit board, and the LED module are arranged inside the inner water sealing wall. The base and the cover are fixed together through recess-projection mating formed between posts and holes to also realize water resistance. The heat generated by the LED module is dissipated by the heat dissipation plate, which is set on an outer surface of the base and is provided with a plurality of convection chambers that induce heat convection.

10 Claims, 7 Drawing Sheets

LOW-PROFILE LIGHT-EMITTING DIODE LAMP STRUCTURE

FIELD OF THE INVENTION

The present invention relates to a structure of light-emitting diode (LED) lamp, and in particular to an LED lamp structure that is water resistant, vibration resistant, and dust resistant, and is durable against impact caused by instantaneous change of electricity, increases lighting range, improves lighting performance, enhance heat dissipation performance and is of a low profile, so as to be suitable for serving as a cargo light for various container trucks (such as refrigeration container truck) and also fit for nighttime lighting, landscape lighting, and submarine lighting.

BACKGROUND OF THE INVENTION

Heretofore, cargo lights used in various container trucks (such as refrigeration container trucks) are often fluorescent lights or incandescent lights, which suffer high power consumption, short service life due to being hard to properly operate in low temperatures, light irradiation containing harmful infrared or ultraviolet light, and bulkiness that hinders arrangement of cargos or commodities (for cargos might collide and impact the cargo light). Thus, light-emitting diodes (LED's) are sometimes used as replacement light sources.

A cargo light using LED as light source still shows several drawbacks:

(1) The interior of a cargo container is often cleaned by spraying water. However, the conventional cargo light is not provided with water resistant means that is strong enough to bear the spraying of intense water jets and this often leads to water penetration and thus malfunction of the cargo light. For a refrigeration container truck, to clean the interior of the refrigeration container, pressurized steam or hot water of approximately 80° C. is applied for washing and disinfection. The water resistance of the conventional cargo light is generally poor in this respect and is susceptible to deformation caused by heat expansion and cold contraction and this makes the problem of water penetration even worse and leads to malfunction caused by the penetrating water.

(2) When a container truck is traveling, it is subjected to continuous and repeated vibration. The conventional cargo light is not provided with vibration resistant means that is sufficient to handle such a situation of continuous vibration, eventually damaging the cargo light.

(3) Some conventional cargo lights use LED's as light source, but those LED's are made for indication purposes and having only very low luminance. Thus, even approximately 20-40 LED's are included in a single cargo light, the lighting range and the lighting performance provided by the cargo light are still insufficient. Further, the inclusion of such a great quantity of LED makes the light very bulky, and this is against the trend of being light-weighted and compact.

(4) Some conventional cargo lights use high brightness LED's to overcome the problem of insufficient lighting performance occurring in the conventional cargo light that uses LED's as light source. However, a different problem occurs. The high brightness LED generates a large amount of heat that must be dissipated by a heat dissipation device that is often bulky, making it not meeting the trend of being light-weighted and compact. In this respect, the present invention aims to provide a heat dissipation solution that enhances the heat dissipation performance and is not bulky.

(5) The conventional cargo light also suffers non-uniform irradiation of light, and this reduces the lighting performance thereof.

(6) The LED used in the conventional cargo lights is white LED. However, in case of refrigeration container truck, at the time the container door is opened, abrupt change of temperature between inside and outside of the container leads to interaction between heat and cold that leads to a white foggy atmosphere in which the white light emitting from the white LED is affected by the moist, often making it hard for an individual to obtain clear vision and thus affecting the movement of cargo.

(7) A truck is often equipped with various electricity consuming appliances and those appliances need to be switched ON/OFF timely. The switching operation of the appliances leads to variation of voltage supplied by the truck. For example, a refrigeration container cargo is equipped with a refrigerant pump that, when being switched ON/OFF, causes surge voltage or surge current, leading to significant variation of voltage and subjecting the cargo light of the truck to an impact caused by the voltage variation and eventually breaking the cargo light.

(8) For the purposes of making the cost reasonable, the conventional cargo light is made with a design that provides a structure that is strong enough to endure variation of temperature and resist vibration and impact (impact caused by instantaneous change of electricity).

SUMMARY OF THE INVENTION

An objective of the present invention is to provide a low-profile light-emitting diode (LED) lamp, which provides enhanced water resistance by setting at least one water barrier (formed of recessed slots and raised ribs) at joints between a base, a cover, a heat dissipation plate, and a light guide hood, which is effective in resisting water jet and water penetration due to parts deformation caused by contact with pressurized steam or hot water, not to mention that the low-profile LED lamp is further filled with a filler material that offers the functions of water resistance, dustproofness, and vibration resistance. Further, with the use of high brightness LED's, the quantity of LED's included in the low-profile LED lamp is substantially reduced and this in turns reduces the overall size of the LED lamp to meet the trends of being light-weighted and compact. The large amount of heat generated by the high brightness LED's is dissipated through a heat dissipation plate that forms convection chambers, which induce heat convection to enhance the heat dissipation performance of the heat dissipation plate, whereby the heat dissipation plate can meet the trend of being light-weighted and compact.

A second objective of the present invention is to provide a low-profile LED lamp, which comprises a circuit board that is provided with a protection circuit comprising at least one constant current circuit and the constant current circuit converts electricity into polarity-free direct current to realize circuit protection and to provide the function of preventing improper plugging with incorrect polarities.

A third objective of the present invention is to provide a low-profile LED lamp, wherein a water seal strip is further provided between the light guide hood and the cover to enhance water resistance thereof.

A fourth objective of the present invention is to provide a low-profile LED lamp, wherein the light guide hood has a light guide section that is made in the form of a concave lens, whereby light from the LED elements can be uniformly disperse in a 180 degree range to realize uniform irradiation, increase lighting range, and enhance lighting performance.

A fifth objective of the present invention is to provide a low-profile LED lamp, wherein yellow LED's are used, and/or a yellow light guide hood is used, and/or a coating of yellow fluorescent powder is applied to the light guide hood, so that visibility of commodities in a white foggy atmosphere (such as inside a freezer cabinet or a refrigeration container) can be enhanced.

To realize the above objectives, the present invention provides a low-profile LED lamp comprising a base, a cover, a heat dissipation plate, a light-emitting diode (LED) module, a circuit board, and a light guide hood.

The base forms a base opening and the base has an inner surface that forms a first rib and holes. The first rib extends around and is located outboard the base opening. The holes are located outboard the first rib. The base has an outer surface on which a second rib that is set around and located outboard the base opening is formed.

The cover forms a cover opening corresponding to the base opening. The cover has an inner surface which defines a first slot corresponding to the first rib and forms posts respectively corresponding to the holes for mating each other. The base and the cover are fixed together by mating the holes and the posts to each other. The inner surface of the cover forms a third slot that extends along and located between the cover opening and the first slot.

The heat dissipation plate has an inner surface that forms a second slot corresponding to and mating the second rib. The heat dissipation plate has an outer surface that forms a plurality of raised portions. A convection chamber is formed between each of the raised portions and the outer surface of the heat dissipation plate.

The LED module comprises a carrier board and at least one LED element mounted to the carrier board. The carrier board is set on the inner surface of the heat dissipation plate and is retained within the base opening.

The circuit board forms a plurality of through holes corresponding to the LED elements to respectively receive the LED elements therethrough. The circuit board is set inside the first rib of the base. The LED module and the circuit board are electrically connected to each other.

The light guide hood comprises a light guide section and a flange formed on a circumference of the light guide section. The flange forms a third rib corresponding to and mating the third slot of the cover.

BRIEF DESCRIPTION OF THE DRAWINGS

The present invention will be apparent to those skilled in the art by reading the following description of preferred embodiments thereof with reference to the drawings, in which.

DETAILED DESCRIPTION OF THE PREFERRED EMBODIMENTS

Figure 7:
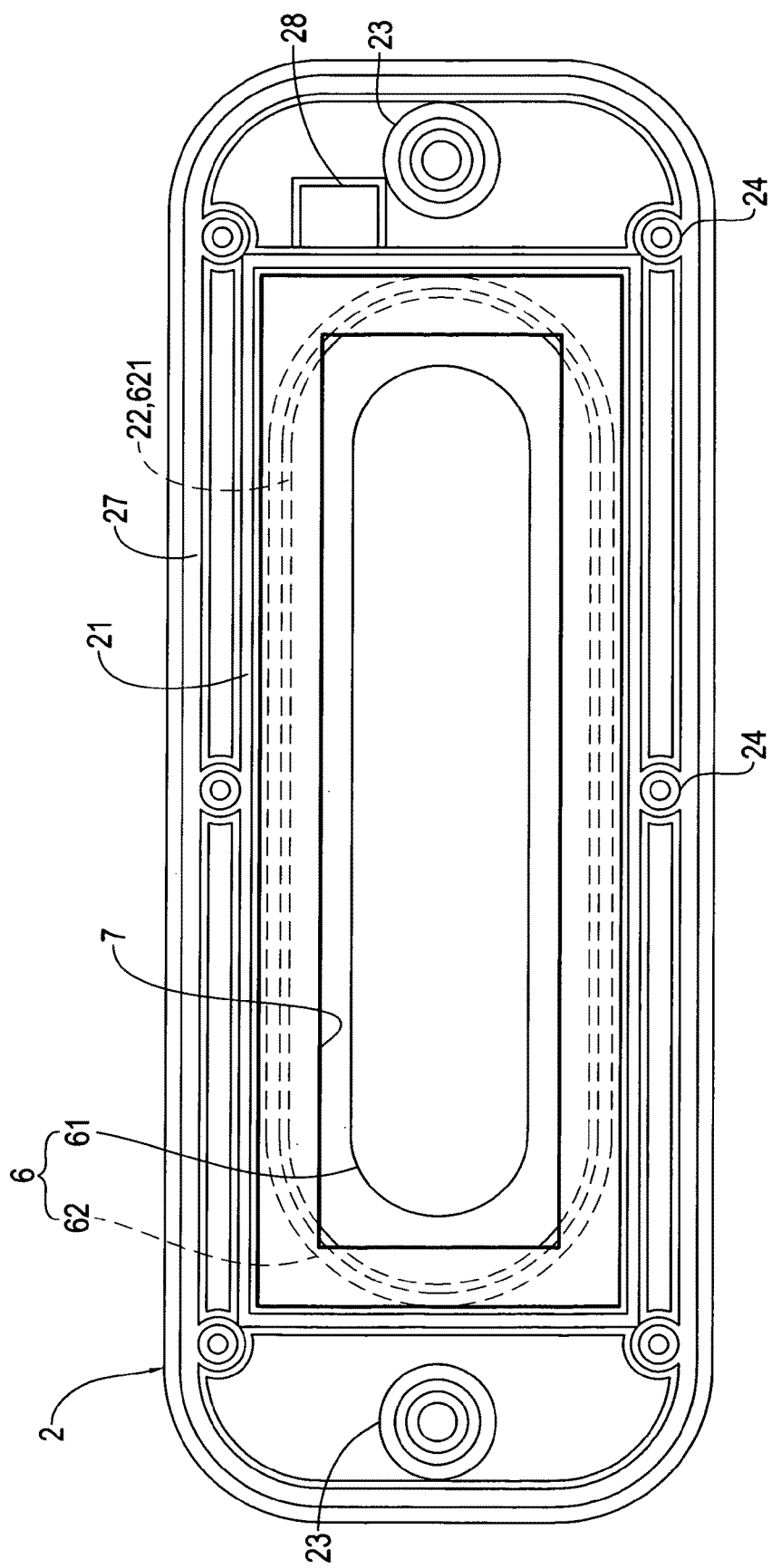
FIG. 7 is a schematic view showing a water seal strip additionally included in the low-profile LED lamp of the present invention.

With reference to the drawings and in particular to FIGS. 1-5, the present invention provides a low-profile light-emitting diode (LED) lamp structure, which comprises a base 1, a cover 2, a heat dissipation plate 3, an LED module 4, a circuit board 5, and a light guide hood 6, and preferably further comprises a water seal strip 7 that is shown in FIG. 7. The base 1 and the cover 2 mate each other and the light guide hood 6, the LED module 4, and the circuit board 5 are received and retained between the base 1 and the cover 2.

The base 1 forms a base opening 10. The base 1 has an inner surface 16 that forms a first rib 11 and first and second holes 14, 15. The first rib 11 extends circumferentially along and is located outboard the base opening 10. The first and second holes 14, 15 are located outboard the first rib 11. The base 1 has an outer surface 17 on which a second rib 12 that is also set around and located outboard the base opening 10 is formed.

Figure 1:
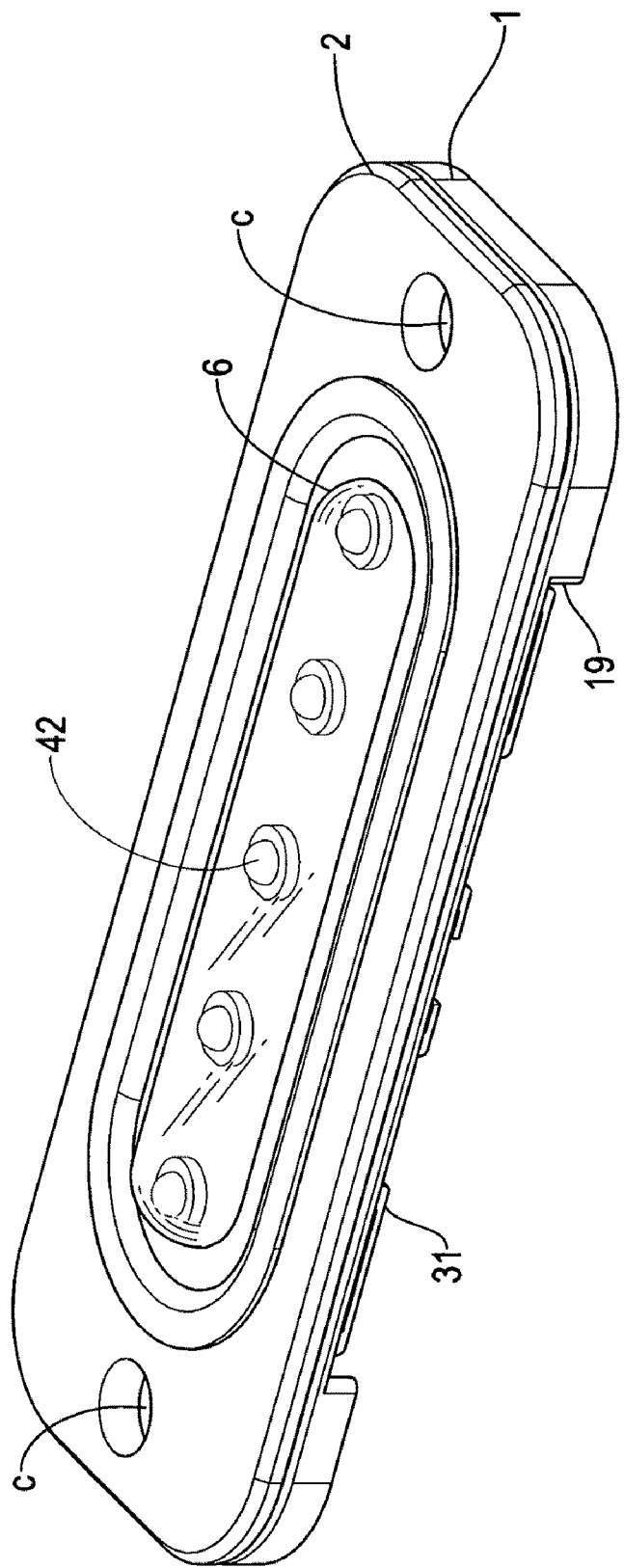
FIG. 1 is a perspective view showing a low-profile light-emitting diode (LED) lamp in accordance with the present invention.
Figure 2:
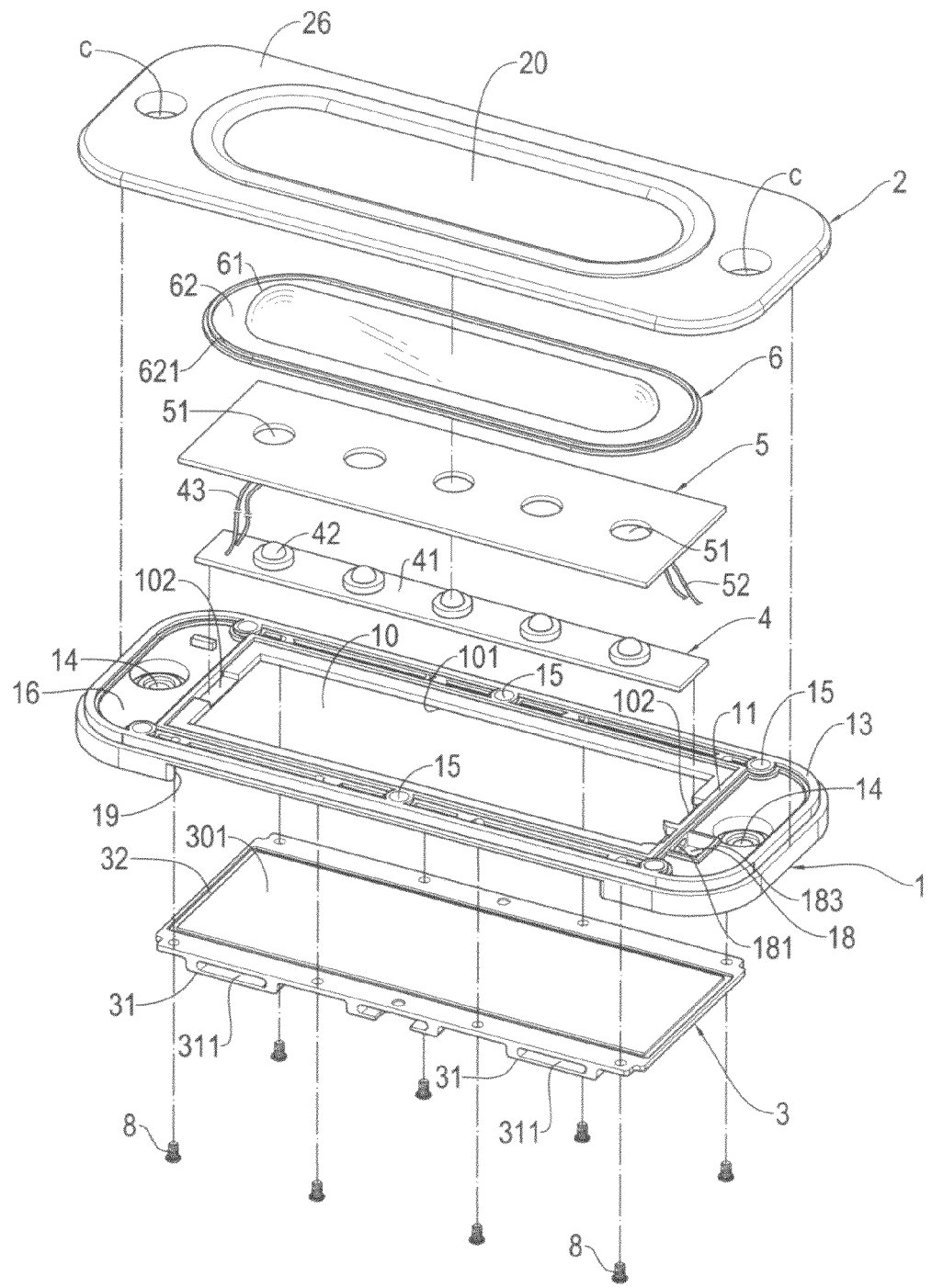
FIG. 2 is an exploded view of the low-profile LED lamp in accordance with the present invention.
Figure 3:
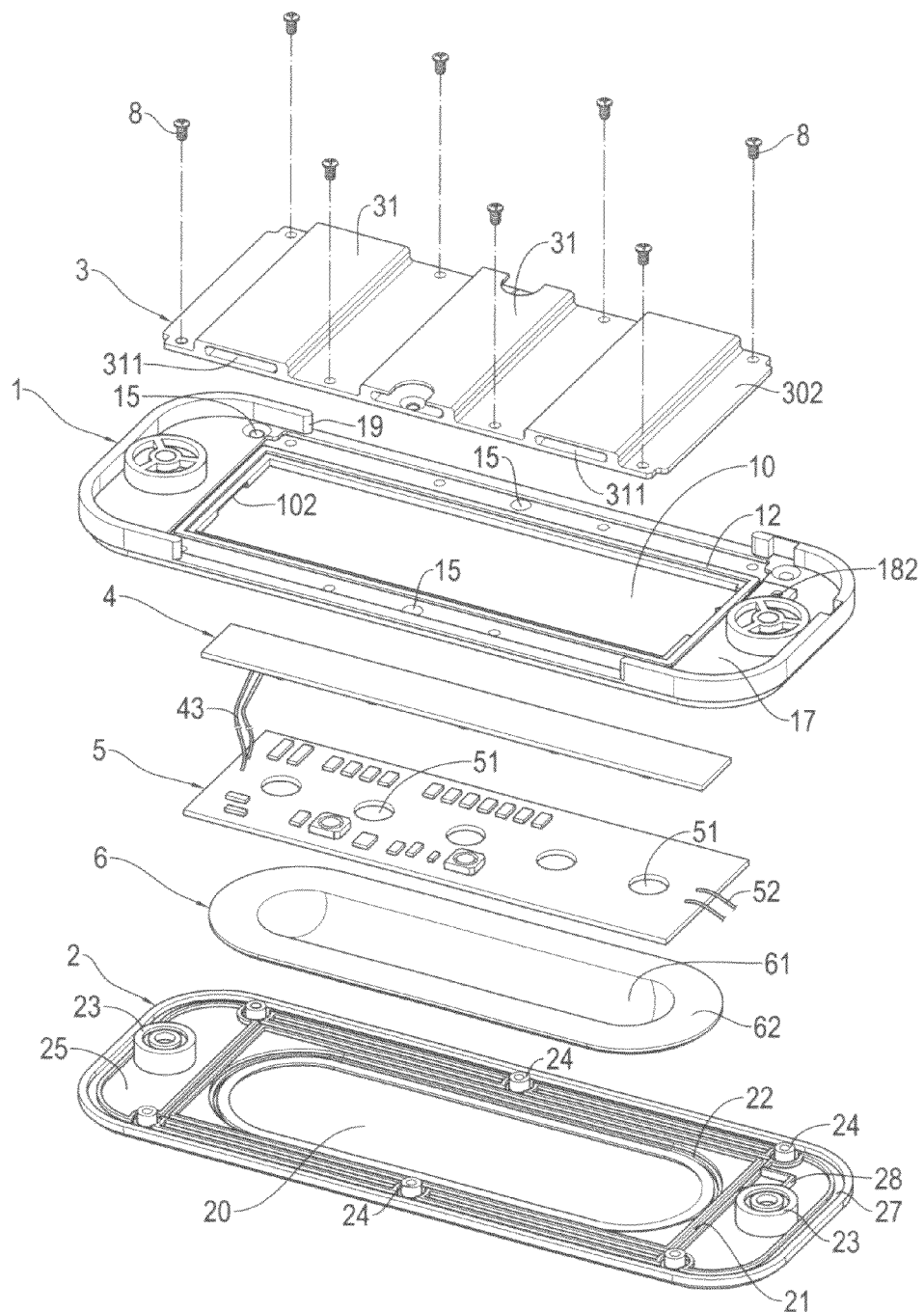
FIG. 3 is another exploded view of the low-profile LED lamp in accordance with the present invention taken from an opposite perspective.
Figure 4:
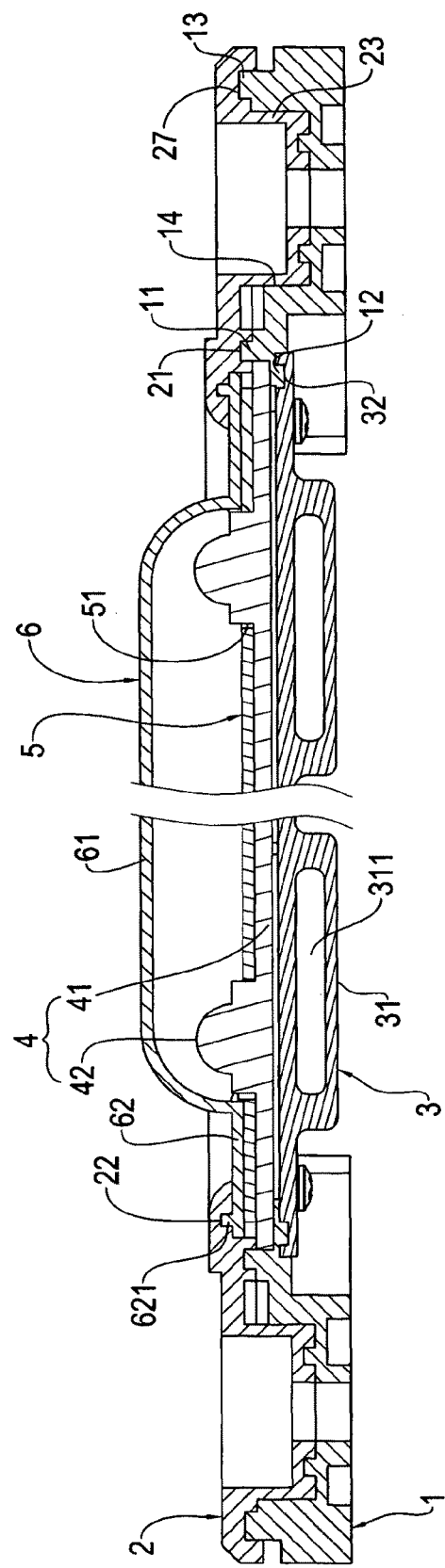
FIG. 4 is a cross-sectional view of the low-profile LED lamp of the present invention in a longitudinal direction.
Figure 5:
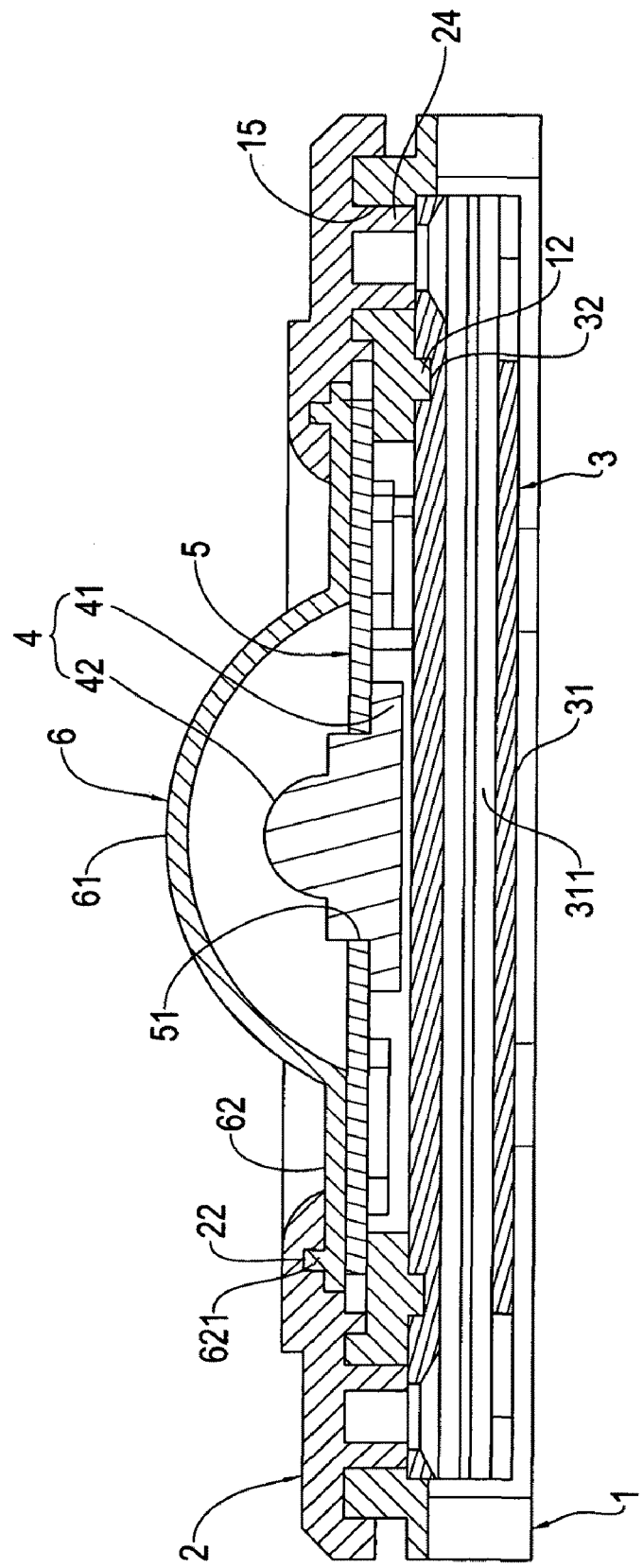
FIG. 5 is a cross-sectional view of the low-profile LED lamp of the present invention in a lateral direction.

The cover 2 forms a cover opening 20 corresponding to the base opening 10. The cover 2 has an inner surface 25 which defines a first slot 21 corresponding to the first rib 11 and forms first and second posts 23, 24 respectively corresponding to the first and second holes 14, 15. The first rib 11 and the first slot 21 mate each other and the first and second holes 14, 15 respectively mate the first and second posts 23, 24. The base 1 and the cover 2 are fixed together by mating the holes 14, 15 and the posts 23, 24 to each other. Each second hole 15 and the respective second post 24 are fixed together by a fastener (not shown), after being properly set to mate each other, to secure the base 1 and the cover 2 in the mated condition. Each first hole 14 and the respective first post 23, after being properly set to mate each other, is provided with a fastener (not shown) to fix the low-profile LED lamp to a predetermined fixture. Each first post 23 forms a mounting bore C in an outer surface 26 of the cover 2, as shown in FIG. 1. The inner surface 25 of the cover 2 forms a third slot 22 that extends along the space between the cover opening 20 and the first slot 21 and has a shape corresponding to the shape of the cover opening 20.

Preferably, the inner surface 16 of the base 1 forms a fourth rib 13, which is located outboard the first rib 11 and extends circumferentially by following the outside contour of the base 1. The first and second holes 14, 15 are located between the first and fourth ribs 11, 13. The inner surface 25 of the cover 2 forms a fourth slot 27 corresponding to and mating the fourth rib 13.

The heat dissipation plate 3 comprises a plurality of fasteners 8 that fix the heat dissipation plate 3 on the outer surface 17 of the base 1. The heat dissipation plate 3 has an inner surface 301 that forms a second slot 32 corresponding to and mating the second rib 12. The heat dissipation plate 3 has an outer surface 302 that forms a plurality of raised portions 31. A convection chamber 311 is formed between each raised portion 31 and the outer surface 302 of the heat dissipation plate 3. The convection chamber 311 functions to enhance heat convection in order to improve heat dissipation performance of the heat dissipation plate 3.

The LED module 4 comprises a carrier board 41 and at least one high brightness LED element 42 mounted to the carrier board 41. The carrier board 41 is set on the inner surface 301 of the heat dissipation plate 3 and preferably, the carrier board 41 is set to lie flat on the inner surface 301 of the heat dissipation plate 3 for heat transfer. Further, the carrier board 41 can be retained inside the base opening 10 in any known means, preferably including a pair of positioning sections 102 form in an inner circumferential rim 101 of the base opening 10, wherein the carrier board 41 is of an elongate strip having opposite ends received and retained in the positioning sections 102. In other words, the LED module 4 is retained within the base opening 10.

The circuit board 5 forms a plurality of through holes 51 corresponding to the LED elements 42 and also comprises associated electronic circuits. The circuit board 5 is set inside the first rib 11 of the base 1. The LED elements 42 of the LED module 4 are received through the through holes 51 to expose outside the circuit board 5. The LED module 4 comprises electrical wires 43 that are electrically connected to the circuit board 5 and the circuit board 5 comprises electrical wires 52 that are electrically connected to an external power source. Preferably, the inner surface 16 of the base 1 forms a wire passage section 18, through which the electrical wires 52 of the circuit board 5 extend outside the low-profile LED lamp.

The wire passage section 18 comprises a first wire passage hole 181 formed through the first rib 11, a second wire passage hole 182 formed through the base 1, and a first frame 183 formed on the inner surface 301 of the base 1. The first frame 183, which is of a U-shape, cooperates with the first rib 11 to surround outside the second wire passage hole 182. The wire passage section 18 is located between the first and fourth ribs 11, 13. The inner surface 25 of the cover 2 forms a second frame 28 corresponding to the first frame 183. The second frame 28 is set to locate outboard the first frame 183 and surrounds and is adjacent to the first frame 183. The second frame 28 is located between the first and fourth slots 21, 27.

The light guide hood 6 comprises a light guide section 61 for guiding light and a flange 62 formed circumferentially around the light guide section 61. The flange 62 forms a third rib 621 corresponding to and mating the third slot 22 of the cover 2.

The assembling of the low-profile LED lamp is as follows: The heat dissipation plate 3 is set on the outer surface 17 of the base 1 with the second rib 12 and the second slot 32 mating each other to form a lower water barrier. The LED module 4 is set in the pair of positioning sections 102 of the base opening 10 with the carrier board 41 lying flat on the inner surface 301 of the heat dissipation plate 3. Thermal paste or thermal grease can be applied between the carrier board 41 and the inner surface 301. The circuit board 5 is positioned inboard the first rib 11 and the LED elements 42 are allowed to extend through the through holes 51 for exposure outside the circuit board 5. The electrical wires 52 are put through the wire passage section 18 to project outside the low-profile LED lamp. The light guide hood 6 is fixed inside the cover opening 20 of the cover 2 with the third rib 621 mating the third slot 22 to form an upper water barrier. The cover 2 with the light guide hood 6 fixed thereto is set on the base 1 with the first and fourth ribs 11, 13 respectively mating the first and fourth slots 21, 27 to form inner and outer water sealing walls and further having the first and second holes 14, 15 mating the first and second posts 23, 24 and the second holes 15 and the second posts 24 being secured together by fasteners that are not shown, whereby the base 1 and the cover 2 are fixed together.

Figure 6:
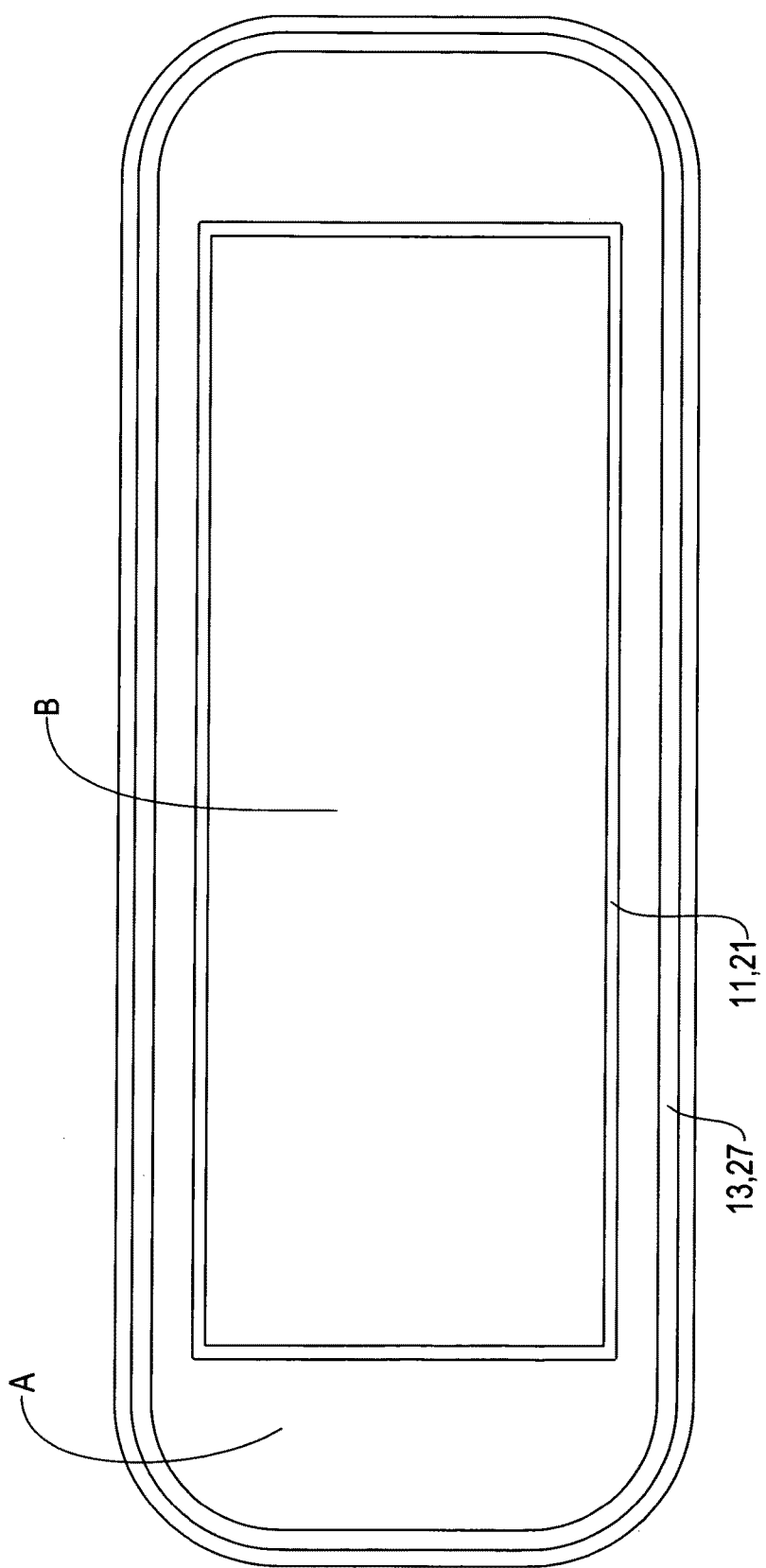
FIG. 6 is a plan view of the low-profile LED lamp of the present invention showing first and second water sealed areas thereof.

Referring to FIG. 6, the inner water sealing wall (the first slot 21 and the first slot 21) and the outer water sealing wall (the fourth rib 13 and the fourth slot 27) form therebetween a first water sealed area A, while the inner water sealing water form therein a second water sealed area B. The LED module 4 and the circuit board 5 are located inside the second water sealed area B. In other words, humidity from the surroundings must first penetrate into the first water sealed area A before the humidity can enter the second water sealed area B. This makes the penetration of water extremely difficult and this is also effective for resistance against water jet or even pressurized steam or hot water of a temperature of 80° that might lead to deformation of the base 1 and the cover 2. Preferably, a filler material (not shown), such as silicone or the likes, is filled between the base 1 and the cover 2 (including the space inside the first frame 183 of the wire passage section 18). The filler material may provide the functions of water resistance, dustproofness, and vibration resistance.

To protect against instantaneous change of the power source, the circuit board 5 may be further provided with a protection circuit (not shown). The protection circuit comprises at least one constant current circuit (not shown), which functions to convert electricity into polarity-free direct current for protection of the LED elements 42 and other electronic circuits on the circuit board 5. The quantity of the LED element 42 included in the LED module 4 can be one or multiple. In case of a single one LED element, the low-profile LED lamp can be formed in a circular configuration or a configuration similar to a circle and in case of multiple LED elements, the low-profile LED lamp can be formed in a square, rectangular, or other quadrilateral shape and is of a rectangular shape in the embodiment illustrated. The LED elements 42 are arranged in a straight line on the elongate strip like carrier board 41. The light guide section 61 of the light guide hood 6 comprises a concave lens, which uniformly disperses the light from the LED elements 42 in 180 degrees to realize uniform irradiation of the light. The LED elements 42 are high brightness LED's, which help improving brightness of lighting. To enhance visibility of commodities stored inside a freezer cabinet or a refrigeration container in which white frog often forms, yellow LED's can be used, or alternatively, a yellow light guide hood 6 is used (such as applying yellow fluorescent powders on the light guide hood 6). Further, the first posts 23 and the first holes 14 may respectively form a water-sealing slot (see FIG. 3) and a water-sealing rib (see FIG. 2) on opposing tips thereof. Referring to FIG. 1, the base 1 may further form a notch 19 that corresponds in position to the raised portions 31 of the heat dissipation plate 3 to dissipate heat from the convection chambers 311 to the surroundings.

FIG. 7 shows another embodiment of the present invention. In this embodiment, the low-profile LED lamp further comprises a water seal strip 7 that is additionally mounted to circumferentially extend inboard the first slot 21 of the cover 2 to enhance water sealing capability and that can be made of rubber strip or any other similar object. The water seal strip 7 is mounted to cover the inner surface 25 of the cover 2 and the flange 62 of the light guide hood 6, but leaves the cover opening 20 uncovered.

Besides being usable as cargo lights in large and small container trucks and large and small refrigeration container trucks, the low-profile LED lamp of the present invention is further applicable to serving as various lighting devices, including interior light of bus, light for machine room of vessel, safety light, work light, and explosion proof light of workshop, landscape lighting, and submarine lighting.

The features of the low-profile LED lamp of the present invention are that enhanced water resistance is provided by setting at least one water barrier or water sealing wall (formed of recessed slots and raised ribs) at joints between the base, the cover, the heat dissipation plate, and the light guide hood, which is effective in resisting water jet and water penetration due to parts deformation caused by contact with pressurized steam or hot water, wherein the range of temperature in which the present invention is applicable is as large as −40° C. to 80° C., not to mention that the low-profile LED lamp is selectively and further filled with a filler material that offers the functions of water resistance, dustproofness, and vibration resistance. Further, with the use of high brightness LED's, the quantity of LED's included in the low-profile LED lamp is substantially reduced and this in turns reduces the overall size of the LED lamp to meet the trends of being light-weighted and compact. The large amount of heat generated by the high brightness LED's is dissipated through a heat dissipation plate that forms convection chambers, which induce heat convection to enhance the heat dissipation performance of the heat dissipation plate, whereby the heat dissipation plate can meet the trend of being light-weighted and compact. The circuit board is provided with a protection circuit that comprises at least one constant current circuit and the constant current circuit converts electricity into polarity-free direct current to realize protection of the circuits and to provide the function of preventing improper plugging with incorrect polarities. A water seal strip may be further and additionally provided between the light guide hood and the cover to enhance water resistance thereof. The light guide hood has a light guide section that is made in the form of a concave lens, whereby light from the LED elements can be uniformly disperse in a 180 degree range to realize uniform irradiation, increase lighting range, and enhance lighting performance. By selecting yellow LED and/or yellow light guide hood and/or applying a coating of yellow fluorescent powder on the light guide hood, visibility of commodities in a white foggy atmosphere inside a freezer cabinet or a refrigeration container can be enhanced. The unique structure of the low-profile LED lamp according to the present invention offers convenience of installation. Further, the low-profile LED lamp of the present invention is capable of standing the hot steam flushing test defined in EN 60529 and DIN 40050-9 and this provides protection against a water pressure exceeding 100 bars (1450 psi) and a temperature of up to 80° C. Water penetration is prevented where pressure is directly applied to sensors and consecutively moved by an increment of angle of 30 degrees (respectively at 0, 30, 60, and 90 degrees) and maintained for 30 seconds at each angle and 120 seconds (two minutes) in total.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A low-profile light-emitting diode (LED) lamp, comprising:
   a base, which forms a base opening, the base having an inner surface that forms a first rib and holes, the first rib extending around and located outboard the base opening, the holes being located outboard the first rib, the base having an outer surface on which a second rib that is set around and located outboard the base opening is formed;
   a cover, which forms a cover opening corresponding to the base opening, the cover having an inner surface which defines a first slot corresponding to the first rib and forms posts respectively corresponding to the holes for mating each other, the base and the cover being fixed together by mating the holes and the posts to each other, the inner surface of the cover forming a third slot that extends along and located between the cover opening and the first slot;
   a heat dissipation plate, which has an inner surface that forms a second slot corresponding to and mating the second rib, the heat dissipation plate having an outer surface that forms a plurality of raised portions, a convection chamber being formed between each of the raised portions and the outer surface of the heat dissipation plate;
   an LED module, which comprises a carrier board and at least one LED element mounted to the carrier board, the carrier board being set on the inner surface of the heat dissipation plate and retained within the base opening;
   a circuit board, which forms a plurality of through holes corresponding to the LED elements to respectively receive the LED elements therethrough, the circuit board being set inside the first rib of the base, the LED module and the circuit board being electrically connected to each other; and
   a light guide hood, which comprises a light guide section and a flange formed on a circumference of the light guide section, the flange forming a third rib corresponding to and mating the third slot of the cover.

2. The low-profile LED lamp as claimed in claim 1, wherein the inner surface of the base forms a fourth rib, which circumferentially extend outboard the first rib, the holes being located between the first and fourth ribs, the inner surface of the cover forming a fourth slot corresponding to and mating the fourth rib, and wherein the first rib mate the first slot form an inner water sealing wall and the fourth rib mate the fourth slot to form an outer water sealing wall, the inner and outer wall sealing walls forming therebetween a first water sealed area, the inner water sealing water forming therein a second water sealed area.

3. The low-profile LED lamp as claimed in claim 1, wherein the base and the cover are filled therebetween with a filler material, which comprises silicone.

4. The low-profile LED lamp as claimed in claim 1 further comprising a water seal strip that is additionally mounted to circumferentially extend inboard the first slot of the cover, the water seal strip being arranged to cover the inner surface of the cover and the flange of the light guide hood.

5. The low-profile LED lamp as claimed in claim 1, wherein the holes comprise first holes and second holes and the posts comprise first posts and second posts, the second holes and the second posts mating each other and respectively secured by fasteners to secure the cover and the base in a mated condition.

6. The low-profile LED lamp as claimed in claim 1, wherein the light guide section of the light guide hood comprises a concave lens, which uniformly disperses light in a 180 degree range.

7. The low-profile LED lamp as claimed in claim 1, wherein the inner surface of the base forms a wire passage section, through which an electrical wire of the circuit board extends outside the low-profile LED lamp.

8. The low-profile LED lamp as claimed in claim 7, wherein the wire passage section comprises a first wire passage hole formed through the first rib, a second wire passage hole formed through the base, and a first frame formed on the inner surface of the base, the first frame surrounding outside the second wire passage hole, the inner surface of the cover forming a second frame corresponding to the first frame, the second frame being located outboard and surrounding the first frame, the first and second frames being adjacent to each other, the inner surface of the base further forming a fourth rib surrounding outside the first rib, the wire passage section being located between the first and fourth ribs, the inner surface of the cover further forming a fourth slot corresponding to and mating the fourth rib, the second frame being is located between the first and fourth slots.

9. The low-profile LED lamp as claimed in claim 1, wherein the circuit board comprises a protection circuit, which comprises at least one constant current circuit that converts electricity into polarity-free direct current.

10. The low-profile LED lamp as claimed in claim 1, wherein the LED element comprises a light source that gives off yellow light.

* * * * *